United States Patent [19]
Freeland

[11] Patent Number: 5,738,302
[45] Date of Patent: Apr. 14, 1998

[54] AIRBORNE VEHICLE

[76] Inventor: Verne L. Freeland, P.O. Box 693652, Miami, Fla. 33269-0652

[21] Appl. No.: 626,853

[22] Filed: Apr. 2, 1996

[51] Int. Cl.$^6$ ................................................ B64C 39/00
[52] U.S. Cl. .................. 244/23 R; 244/23 D; 244/51; 244/224; 180/116
[58] Field of Search ............................. 244/51, 52, 12.1, 244/12.2, 12.3, 12.4, 23 R, 23 B, 23 C, 23 D, 225, 227, 224; 180/116–119, 126; 114/67 A

[56] References Cited

U.S. PATENT DOCUMENTS

| | | |
|---|---|---|
| 2,953,321 | 9/1960 | Robertson et al. . |
| 2,955,780 | 10/1960 | Hulbert ........................... 244/23 R |
| 3,039,550 | 6/1962 | Beardsley . |
| 3,061,242 | 10/1962 | Zurawinski et al. ............... 244/23 A |
| 3,088,536 | 5/1963 | Chezem . |
| 3,135,480 | 6/1964 | Chaplin, Jr. . |
| 3,184,183 | 5/1965 | Piasecki ............................ 244/238 |
| 3,198,274 | 8/1965 | Cocksedge . |
| 3,208,543 | 9/1965 | Crowley . |
| 3,262,511 | 7/1966 | Carr . |
| 3,608,662 | 9/1971 | Ferguson . |
| 3,662,852 | 5/1972 | Taylor . |
| 3,662,854 | 5/1972 | Bertin . |
| 3,709,318 | 1/1973 | Ferguson . |
| 3,730,298 | 5/1973 | Schouw . |
| 3,931,864 | 1/1976 | Desbarats . |
| 4,666,012 | 5/1987 | Howell et al. . |
| 4,862,984 | 9/1989 | Onizaki et al. . |

*Primary Examiner*—Galen L. Barefoot
*Attorney, Agent, or Firm*—Wigman, Cohen, Leitner & Myers, P.C.

[57] ABSTRACT

An airborne vehicle generally comprises a body, a lifting mechanism for lifting the vehicle, and a steering mechanism operable by a user for steering the vehicle. The lifting mechanism comprises first and second counter-rotating propellers mounted in a front end and a rear end, respectively, of the vehicle body. The lifting mechanism further comprises a front air intake and a rear air intake mounted in proximity to and above the first and second propellers, respectively. The steering mechanism comprises a plurality of louvers mounted on a bottom of the vehicle body below the first and second propellers. The operator uses a steering mechanism in a passenger position to adjust inclinations of the louvers so as to steer the vehicle.

26 Claims, 3 Drawing Sheets

AIRBORNE VEHICLE

TECHNICAL FIELD

The present invention generally relates to an airborne vehicle, and more particularly to an airborne vehicle having specially designed lifting and steering mechanisms.

BACKGROUND ART

In the past, various vehicles providing the individual user with the capability of airborne travel have been provided. Typically, such airborne vehicles of the prior art travel on an "air cushion" and can be classified as "ground effect" machines. Such "ground effect" or "air cushion" machines of the prior art have taken various forms, such as the vertical take-off flying platform disclosed in U.S. Pat. No. 2,953,321. Other vehicles of the prior art include those disclosed in the following patents: U.S. Pat. Nos. 3,039,550; 3,088,536; 3,135,480; 3,198,274; 3,208,543; 3,262,511; 3,608,662; 3,662,852; 3,662,854; 3,709,318; 3,730,298; 3,931,864; 4,666,012; and 4,862,984.

"Ground effect" or "air cushion" machines of the prior art have certain obvious limitations. For example, typically, such vehicles are unable to move over ground obstructions, and thus they must rely upon the steering capability of the particular vehicle in order to traverse such ground obstructions. Another limitation of such vehicles of the prior art pertains to their steering capability.

For example, the flying platform disclosed in U.S. Pat. No. 2,953,321 (cited above) comprises a table-like station on which a pilot stands, the table-like station being positioned adjacent to an upper or inlet end of a propeller housing so that all thrust forces are directed in an upward direction to propel the pilot and the station on which he is standing through the air. In such a flying platform, however, direction of flight control (that is, transition from vertical to horizontal or lateral flight, as well as change in the direction of flight) is effected by the pilot's balance, that is, by the pilot's ability to tip the craft or vehicle in the direction in which the pilot desires to fly. Such tipping action tilts both the craft and the air column, thus introducing a horizontal thrust component which drives the craft in the direction of tilt. Thus, steering capability is dependent upon the ability of the pilot or his dexterity in tilting the platform in the direction of desired travel.

Therefore, there is a need in the prior art for the development of an airborne vehicle having a "vertical lift" capability not involving an "air cushion" or a "ground effect". That is to say, there is a need in the prior art for an airborne vehicle designed to rise above and travel over obstacles encountered in the path of the vehicle, rather than steer or go around such obstacles, as is the case in the "air cushion" or "ground effect" vehicles. Thus, there is also a need in the prior art for the development of an airborne vehicle which, insofar as its steering capability is concerned, is not dependent upon the dexterity or capability of the user to tilt the vehicle for the purpose of steering same.

DISCLOSURE OF INVENTION

The present invention generally relates to an airborne vehicle, and more particularly to an airborne vehicle having specially designed lifting and steering mechanisms.

In particular, the airborne vehicle disclosed herein comprises a body, a lifting mechanism for lifting the vehicle, and a steering mechanism operable by the user for steering the vehicle. Preferably, the lifting mechanism comprises first and second counter-rotating propellers mounted in the front end and rear end, respectively, of the body of the vehicle. In a preferred embodiment of the invention, the lifting mechanism comprises front and rear air intakes mounted in the front end and rear end, respectively, of the body of the vehicle in proximity to and above the first and second propellers, respectively.

Preferably, the steering mechanism of the present invention comprises a plurality of louvers disposed on the bottom of the body of the vehicle below the first and second propellers, the louvers being operated by a handlebar or similar steering mechanism operable by the user for adjusting inclinations of the louvers so as to deflect air passing therethrough.

Therefore, it is a primary object of the present invention to provide an airborne vehicle.

It is an additional object of the present invention to provide an airborne vehicle having a lifting mechanism and a steering mechanism.

It is an additional object of the present invention to provide an airborne vehicle having a lifting mechanism comprising first and second counter-rotating propellers mounted on a front end and rear end, respectively, of the vehicle body.

It is an additional object of the present invention to provide an airborne vehicle having a front air intake and a rear air intake connected to the front and rear ends, respectively, of the vehicle body.

It is an additional object of the present invention to provide an airborne vehicle having front and rear air intakes mounted above first and second propellers, respectively.

It is an additional object of the present invention to provide an airborne vehicle having a plurality of louvers disposed on a bottom of the vehicle below first and second counter-rotating propellers.

It is an additional object of the present invention to provide an airborne vehicle having a steering mechanism operable by the user for adjusting inclinations of louvers mounted on the bottom of the vehicle so as to deflect air passing therethrough.

The above and other objects, and the nature of the invention, will be more clearly understood by reference to the following detailed description, the associated drawings, and the appended claims.

BEST MODE FOR CARRYING OUT THE INVENTION

The invention will now be described in more detail with respect to the various figures of the drawings.

Figure 1:
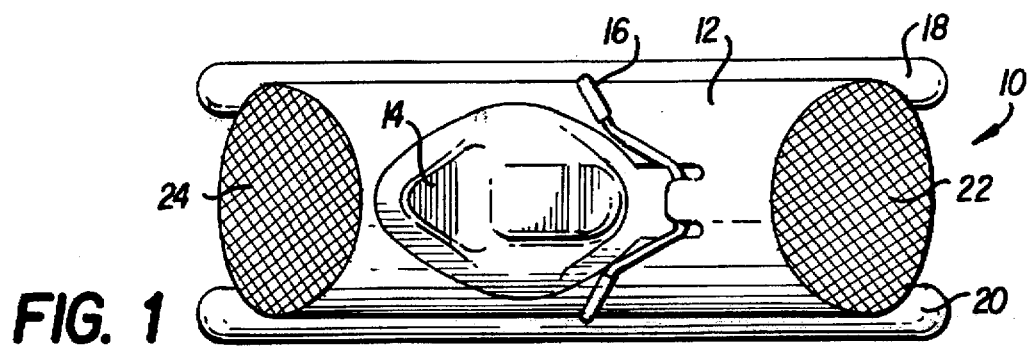
FIG. 1 is a top view of the airborne vehicle of the present invention.
Figure 2:
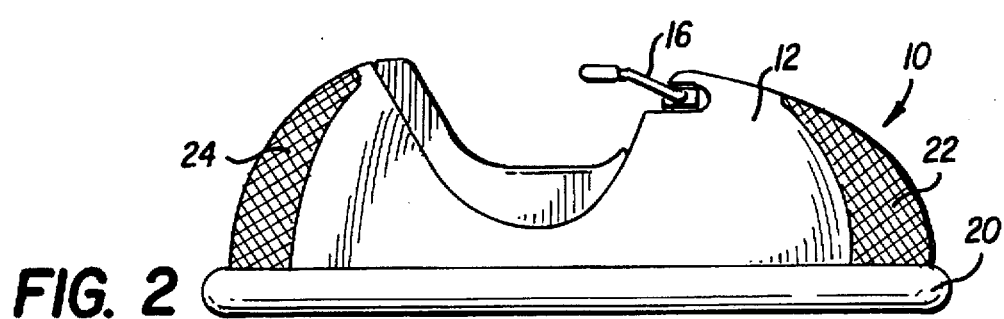
FIG. 2 is a side view of the airborne vehicle of the present invention.

FIG. 1 is a top view of the airborne vehicle of the present invention, while FIG. 2 is a side view of the airborne vehicle of the present invention. As seen therein, the airborne vehicle 10 has a contoured body or cowling 12 having a narrowed portion so as to form a passenger position or seat 14, a handlebar or steering mechanism 16, pontoons 18 and 20, a front air intake 22 and a rear air intake 24.

The handlebar or steering mechanism 16 is disposed in proximity to the passenger seat or position 14, and is used by the user or passenger to steer the vehicle in a manner which will be described in more detail below. Pontoons 18 and 20 are mounted on a bottom portion of the vehicle (see FIGS. 1 and 2), and facilitate landing of the vehicle on land or water.

Front air intake 22 and rear air intake 24 are meshed or grilled air intakes through which air passes as the vehicle 10 is operated. That is to say, as best seen in FIG. 2, as the vehicle 10 rises, moves forward, or moves to the rear, air passes through intakes 22 and 24 and is utilized, in a manner to be described in more detail below, to facilitate operation of the vehicle.

Figure 3:
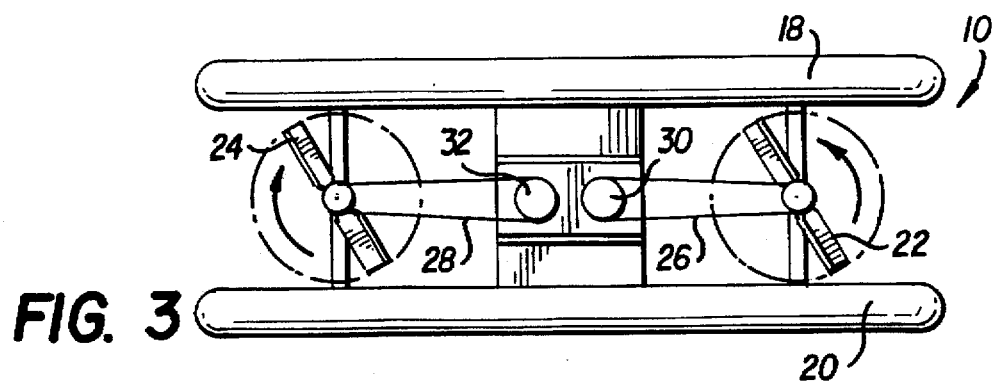
FIG. 3 is a top view of the interior portion of the airborne vehicle of the present invention.

FIG. 3 is a top view of the interior of the airborne vehicle of the present invention, with the body or cowling 12 (FIGS. 1 and 2) removed from the vehicle 10. As seen in FIG. 3, the airborne vehicle 10 further comprises a front propeller 22, rear propeller 24, belts 26 and 28, and drives 30 and 32.

In operation, drive 30 is rotated by the vehicle motor (not shown) so as to motivate belt 26 which, in turn, causes propeller 22 to rotate in the counterclockwise direction. Similarly, drive 32 is rotated by the vehicle motor (not shown) so as to motivate belt 28 to rotate the propeller 24 in the clockwise direction. It should be noted that the airborne vehicle 10 is provided with counter-rotating propellers 22 and 24 so as to avoid any torque problems which might result from the utilization of front and rear propellers rotating in the same direction.

Figure 4:
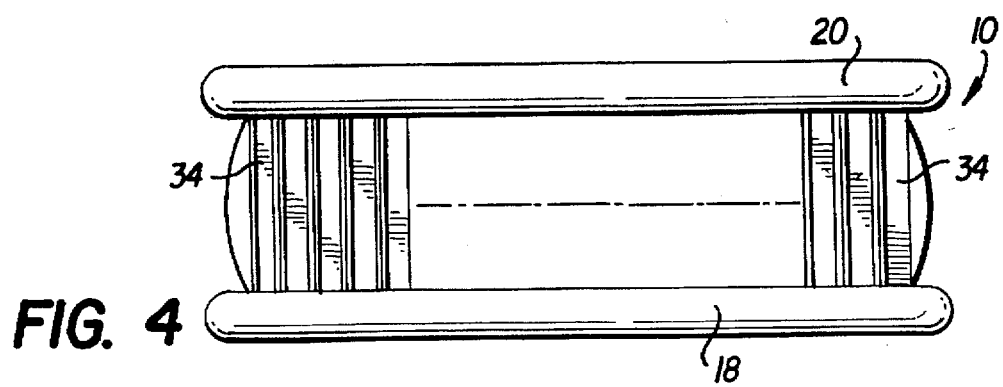
FIG. 4 is a bottom view of the airborne vehicle of the present invention.

FIG. 4 is a bottom view of the airborne vehicle of the present invention. As seen therein, the bottom of the vehicle 10 is provided with pontoons 18 and 20 discussed above, but is additionally provided with interlocking grid/steel louvers 34 and 36. Although FIG. 4 shows steel louvers 34 and 36 located in the front and rear ends of the vehicle only, it is to be understood, that, in accordance with the present invention, the entire bottom of the vehicle 10 is provided with interlocking grid/steel louvers 34 and 36. As described in more detail below, louvers 34 control air deflection, and thus, direction of thrust experienced by the vehicle 10 during operation.

The operation of the airborne vehicle 10 will now be described with reference to FIGS. 1–4. The user or passenger sits in the seat 14 adjacent to handlebar mechanism 16, and activates the vehicle 10 (turns on the motor) in a conventional manner. The vehicle motor (not shown) activates the drives 30 and 32 (FIG. 3) so as to motivate belts 26 and 28, respectively, to rotate propellers 22 and 24, respectively. As mentioned previously, propeller 22 preferably rotates in the counterclockwise direction, while propeller 24 preferably rotates in the clockwise direction (although the directions of rotation of propellers 22 and 24 could just as easily be in opposite directions, so long as they are counter-rotating).

As a result of rotation of propellers 22 and 24, air is drawn into the front air intake 22 and rear air intake 24 (FIGS. 1 and 2), and this air is directed downward through propellers 22 and 24, respectively, and then through the louvers 34 and 36 located in the bottom of the vehicle (see FIGS. 3 and 4). As a result, the vehicle 10 rises vertically.

With respect to the steering capability of the vehicle 10, the user or operator operates the handlebar or steering mechanism 16 (FIGS. 1 and 2), and this varies or adjusts the inclinations of the louvers 34 and 36 located in the bottom of vehicle 10 (FIG. 4). The variation or adjustment in the inclinations of the louvers 34 and 36, in turn, controls deflection of air passing through propellers 22 and 24, and this results in adjustment or control in the direction of thrust experienced by the vehicle 10. As a result, the vehicle is caused to move forward, rearward, to the left, or to the right.

Figure 5A:
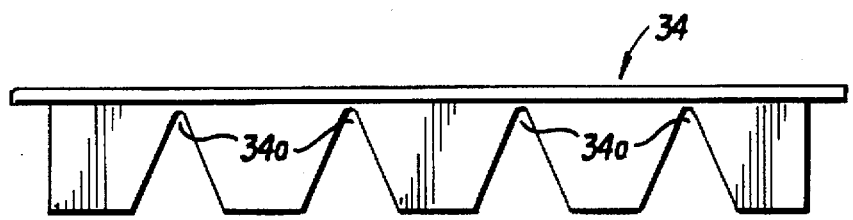
FIGS. 5A and 5B are side views of the cross louvers and the lengthwise louvers, respectively, of the present invention.

Control and operation of the louvers 34 and 36 will now be described in more detail with reference to FIGS. 5A and 5B, which are side views of the cross louvers 34 and lengthwise louvers 36, respectively, of the present invention. The cross louvers 34 of FIG. 4 extend laterally or transversely across the width of vehicle 10, and thus the side view of cross louvers 34 depicted in FIG. 5A represents the configuration of cross louvers 34 when viewed from the front end or rear end of the vehicle 10. Similarly, lengthwise louvers 36 of FIG. 4 extend along the length of the vehicle 10, and thus the side view of louvers 36 seen in FIG. 5B represents the configuration of lengthwise louvers 36, when viewed from the left side or right side of the vehicle 10.

Figure 5B:
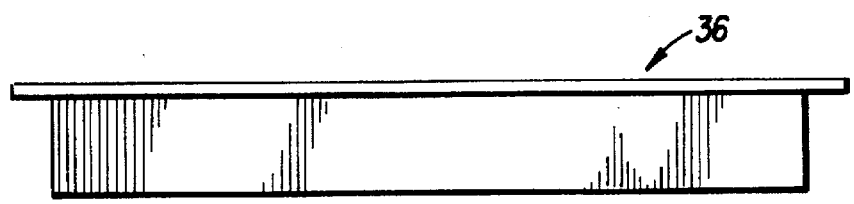

Further referring to FIGS. 5A and 5B, it should be noted that, in accordance with the present invention, cross louvers 34 are notched so as to form grooves 34a therein, and the grooves 34a are provided in order to accommodate lengthwise louvers 36. As a result of this special configuration of cross louvers 34, cross louvers 34 and lengthwise louvers 36 can be easily arranged in mutually perpendicular fashion, as best seen in the perspective view of FIG. 5C.

Figure 5C:
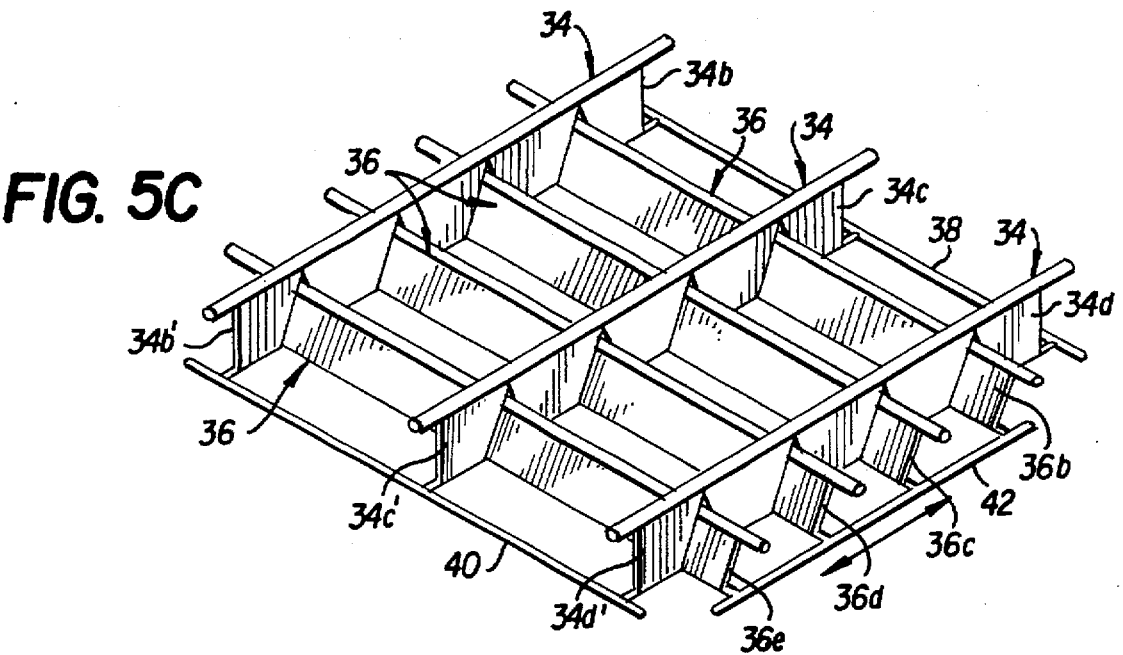
FIG. 5C is a top, prospective view of the cross louvers and the lengthwise louvers in their operational arrangement as mounted and/or suspended in grid-like manner beneath the propellers of the airborne vehicle of the present invention.

FIG. 5C is a top, perspective view of the cross louvers 34 and lengthwise louvers 36 in the mutually perpendicular arrangement previously described. In accordance with the present invention, the bottom end edges of end portions 34b, 34c and 34d of cross louvers 34 are interconnected by a cross louver tiebar 38, while the other end portions 34b', 34c' and 34d' of cross louvers 34 are interconnected by cross louver tiebar 40.

Similarly, bottom end edges of end portions 36b, 36c, 36d and 36e of lengthwise louvers 36 are interconnected by lengthwise louver tiebar 42. Moreover, the other end portions (not shown) of lengthwise louvers 36 are interconnected by a further lengthwise louver tiebar (also not shown).

Thus, as seen in FIG. 5C, cross louvers 34 and lengthwise louvers 36 are mounted and/or suspended, in grid-like manner, beneath the propellers 22 and 24 (FIG. 3) of the vehicle 10 at each end of the vehicle 10 (see FIG. 4), and the arrangement of louvers 34 and 36 in a crossing pattern appears similar to the dividers or partitions in an ice cube tray. The operation of the cross louvers 34 will now be described with reference to FIGS. 5D, 5E and 5F, which show the cross louvers 34 in the stationary state, the forward movement state, and the rearward movement state, respectively, of the vehicle 10.

Figure 5D:
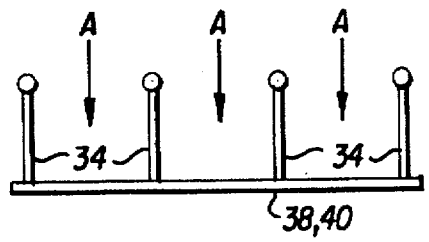
FIGS. 5D–5F are end views, from the right side of the vehicle, of the cross louvers in the stationary state, forward movement state, and rear movement state, respectively.

FIG. 5D is an end view of the cross louvers 34, as seen from the right side of the vehicle 10 (FIG. 2). As previously indicated, cross louver tiebar 38 interconnects the lower outside edge portions 34b, 34c and 34d of cross louvers 34 on one side of vehicle 10 (FIG. 5C), while cross louver tiebar 40 interconnects the louver outside edge portions 34b', 34c' and 34d' of cross louvers 34 on the other side of the vehicle 10. In the normal, non-inclined state, cross louvers 34 are oriented in the vertical direction, as seen in FIG. 5D, so that air generated by propellers 22 and 24 (FIG. 3) moves in the downward direction (direction of the arrow A) as seen in FIG. 5D. In this state, the vehicle is stationary.

Figure 5E:
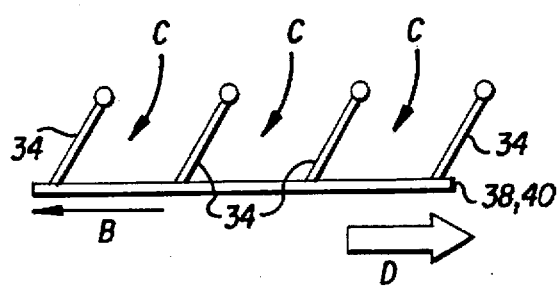

Referring to FIG. 5E, when the cross louver tiebars 38 and 40 are moved in the rearward direction (indicated by arrow B), cross louvers 34—which have their upper ends fixed and stationary—are inclined from upper right to lower left in FIG. 5E, and air generated by propellers 22 and 24 (FIG. 3) moves in the direction of arrows C. Thus, the downwardly propelled air is deflected toward the rear of the vehicle 10, and this results in the generation of a force urging the vehicle forward (as indicated by arrow D in FIG. 5E).

Figure 5F:
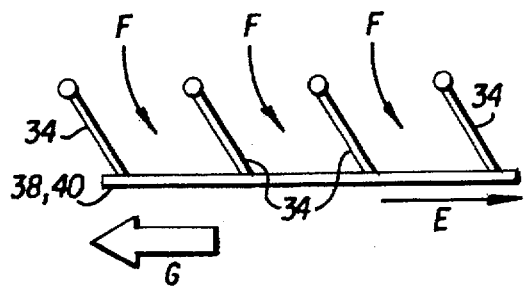

Conversely, referring to FIG. 5F, when cross louver tiebars 38 and 40 are moved in the forward direction (indicated by arrow E), the cross louvers are inclined from upper left to lower right in FIG. 5F, and air generated by propellers 22 and 24 (FIG. 3) moves in the direction of arrows F in FIG. 5F. This results in deflection of air in the forward direction, with the resultant generation of a force propelling the vehicle in the rearward direction, as indicated by arrow G in FIG. 5F.

The operation of lengthwise louvers 36 is quite similar to the operation of cross louvers 34, as just described, and will be described with reference to FIGS. 5G, 5H and 5I.

Figure 5G:
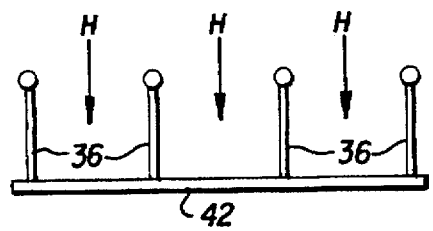
FIGS. 5G–5I are end views, from the rear of the vehicle, of the lengthwise louvers in the stationary state, rightward movement state and leftward movement state, respectively.
Figure 5H:
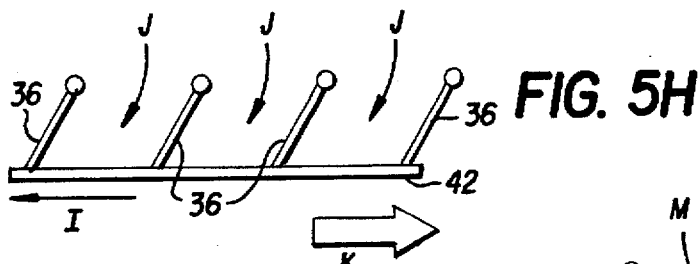
Figure 5I:
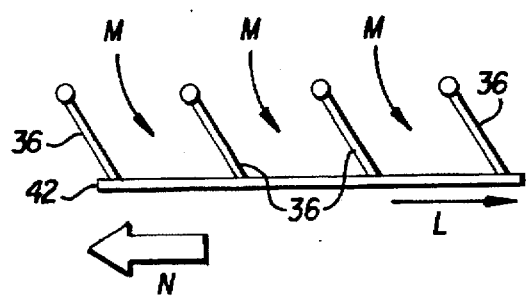

FIG. 5G shows the lengthwise louvers 36 in the normal non-inclined state so that air moves downward in the direction indicated by arrow H and the vehicle is stationary.

When lengthwise louver tiebar 42 is moved to the left (arrow I in FIG. 5H), the downward air generated by propellers 22 and 24 (FIG. 3) is deflected to the left, (arrows J), thereby pushing the vehicle 10 to the right (arrow K). Similarly, movement of lengthwise louver tiebar 42 to the right (arrow L) causes the downward air to be deflected to the right (arrows M), thereby pushing the vehicle 10 to the left (arrow N).

Figure 6:
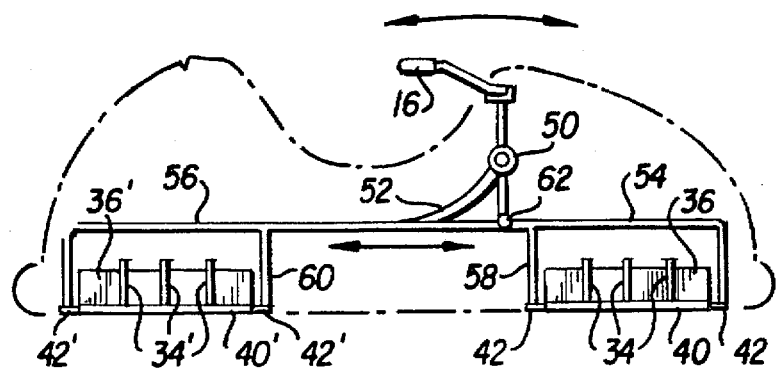
FIG. 6 is a diagram of the mechanism used to control operation of the louvers by manipulation of the handlebar of the present invention.

Control of the cross louver tiebars 38 and 40 and lengthwise louver tiebars 42 will now be described with reference to FIG. 6, which depicts the handlebar 16 of the vehicle 10 and its associated arrangement. More specifically, as seen in FIG. 6, a pivot or fulcrum 50 is fixed to the frame 52 of the motorcycle, and serves as a pivoting point for handlebar 16. The lower end of handlebar 16 is connected to a front control bar 54 and a rear control bar 56, the front control bar 54 being connected to cross louver tiebar 40 in the front of the vehicle 10, and the rear control bar 56 being connected to cross louver tiebar 40' in the rear of the vehicle 10.

As further seen in FIG. 6, side extension bars 58 are connected to front control bar 54, while further side extension bars 60 are connected to rear control bar 56. The side extension bars 58 are further connected to lengthwise louver tiebars 42 in the front of vehicle 10, while the side extension bars 60 are connected to lengthwise louver tiebars 42' in the rear of vehicle 10.

In operation, when the user pushes down on handlebars 16, the lower portion of handlebar 16 pivots about fulcrum 50, causing frontward motion of control bars 54 and 56, with resultant frontward movement of the cross louver tiebars 40 and 40' (of course, frontward movement of corresponding cross louver tiebars 38 on the other side of vehicle 10 takes place as well). As previously described with reference to FIG. 5F, forward movement of the cross louver tiebars 38 and 40 causes the cross louvers 34 to deflect downward air in the forward direction (as indicated by the arrows F in FIG. 5F), and as a result the vehicle 10 is propelled in the rearward direction (as indicated by arrow G in FIG. 5F).

Conversely, when the user pulls up on handlebars 16 (FIG. 6), control bars 54 and 56 move toward the rear of vehicle 10, and cross louver tiebars 40 and 40' also move toward the rear (as do corresponding cross louver tiebars 38). As previously described with reference to FIG. 5E, rearward movement of cross louver tiebars 38 and 40 causes the cross louvers 34 to deflect air in the rearward direction (arrow C in FIG. 5E), resulting in the pushing of the vehicle 10 forward (as indicated by arrow D in FIG. 5E).

When the user pushes or tilts handlebars 16 (FIG. 6) downward on the right side of the vehicle 10, side extension bars 58 and 60 pivot about a further fulcrum 62, causing leftward movement of lengthwise louver tiebars 42 and 42', and consequent inclination of lengthwise louvers 36. This results in deflection of downwardly moving air to the left (arrow J in FIG. 5H), with consequent pushing of the vehicle 10 to the right (arrow K in FIG. 5H).

Finally, when the user tilts the handlebars 16 (FIG. 6) downward on the left side, side extension bars 58 and 60 rotate about fulcrum 62, with consequent movement of lengthwise louver tiebars 42 and 42' to the right. As a result, downwardly moving air is deflected to the right (arrow M in FIG. 5I), with consequent pushing or movement of the vehicle 10 to the left (arrow N in FIG. 5I).

It should be noted that FIG. 6 describes merely one embodiment of a louver control mechanism which can be used in accordance with the present invention. It should be obvious to a person of ordinary skill in the art that the mechanism described above with respect to FIG. 6 could be replaced, and its function implemented by, any other suitable mechanism, such as a "joystick" control mechanism, if desired.

While preferred forms and arrangements have been shown in illustrating the invention, it is to be understood that various changes and modifications may be made without departing from the spirit and scope of this disclosure.

I claim:

1. An airborne vehicle, comprising:

a body;

lifting means connected to said body for lifting said vehicle; and steering means operable by a user for steering said vehicle;

wherein said lifting means comprises a first propeller mounted in a front end of said body and a second propeller mounted in a rear end of said body, said first propeller and said second propeller rotating in a horizontal plane and said first propeller rotating in a direction opposite to a rotating direction of said second propeller so as to lift said vehicle in a vertical direction perpendicular to said horizontal plane; and wherein said steering means comprises a plurality of louvers mounted in said body of said vehicle below said first and second propellers and a single steering control operable by the user for adjusting inclinations of all of said louvers so as to deflect air passing through said louvers, whereby to steer said vehicle.

2. The vehicle of claim 1, wherein said lifting means further comprises a front air intake connected to said front end of said body and a rear air intake connected to said rear end of said body.

3. The vehicle of claim 2, wherein said front air intake is mounted above said first propeller and said rear air intake is mounted above said second propeller.

4. The vehicle of claim 1, wherein said steering control comprises a handlebar mounted on said body of said vehicle.

5. The vehicle of claim 1, wherein said steering control is disposed on said body of said vehicle at a position between said front end and said rear end of said body.

6. The vehicle of claim 1, wherein said plurality of louvers comprises cross louvers and lengthwise louvers.

7. The vehicle of claim 6, wherein said cross louvers control forward and rearward movement of said vehicle.

8. The vehicle of claim 6, wherein said lengthwise louvers control leftward and rightward movement of said vehicle.

9. The vehicle of claim 6, wherein one of said cross louvers and said lengthwise louvers is notched so as to facilitate arrangement of said cross louvers and said lengthwise louvers in a mutually perpendicular relationship.

10. The vehicle of claim 6, wherein said steering means further comprises a cross-louver tiebar interconnecting said cross louvers and a lengthwise louver tiebar interconnecting said lengthwise louvers.

11. The vehicle of claim 1, wherein said steering means further comprises a tiebar interconnecting said louvers and a control bar interconnecting said steering control and said tiebar.

12. The vehicle of claim 11, wherein said steering means comprises a plurality of additional louvers mounted in said body below said first and second propellers, an additional tiebar interconnecting said additional louvers, and an extension bar interconnecting said steering control and said additional tiebar.

13. The vehicle of claim 12, wherein said steering control comprises a handlebar mounted on said body of said vehicle and rotatable about a first axis to move said control bar and rotatable about a second axis to move said extension bar.

14. The vehicle of claim 11, wherein said steering control comprises a handlebar mounted on said body of said vehicle and rotatable about an axis to move said control bar.

15. The vehicle of claim 1, further comprising pontoon means disposed on a lower portion of said body for facilitating landing of said vehicle on water and land.

16. An airborne vehicle, comprising:
a body;
lifting means connected to said body for lifting said vehicle; and
steering means operable by a user for steering said vehicle;
wherein said steering means comprises a plurality of cross louvers and lengthwise louvers arranged in a grid-like pattern and mounted in said body of said vehicle below said lifting means, cross louver tiebars interconnecting said cross louvers and lengthwise louver tiebars interconnecting said lengthwise louvers, and a single steering control operably connected to said cross louver tiebars and to said lengthwise louver tiebars for adjusting inclinations of said louvers so as to deflect air passing through said louvers, whereby to steer said vehicle.

17. The vehicle of claim 16, wherein said steering control comprises a handlebar mounted on said body of said vehicle.

18. The vehicle of claim 17, wherein said steering control is disposed on said body of said vehicle at a position between a from end and a rear end of said body.

19. The vehicle of claim 16, wherein said cross louvers control forward and rearward movement of said vehicle.

20. The vehicle of claim 16, wherein said lengthwise louvers control leftward and rightward movement of said vehicle.

21. The vehicle of claim 16, wherein one of said cross louvers and said lengthwise louvers is notched so as to facilitate arrangement of said cross louvers and said lengthwise louvers is a mutually perpendicular relationship.

22. The vehicle of claim 16, wherein said steering means further comprises a control bar interconnecting said steering control and said cross louver tiebars.

23. The vehicle of claim 22, wherein said steering means further comprises an extension bar interconnecting said steering control and said lengthwise louver tiebars.

24. The vehicle of claim 23, wherein said steering control comprises a handlebar mounted on said body of said vehicle and rotatable about a first axis to move said control bar and rotatable about a second axis to move said extension bar.

25. The vehicle of claim 22, wherein said steering control comprises a handlebar mounted on said body of said vehicle and rotatable about an axis to move said control bar.

26. The vehicle of claim 16, further comprising pontoon means disposed on a lower portion of said body for facilitating landing of said vehicle on water and land.

* * * * *